United States Patent

[11] 3,609,563

[72] Inventors Leon Zinn
 Syosset, N.Y.;
 Milton Bodin, Teaneck, N.J.
[21] Appl. No. 775,025
[22] Filed Nov. 12, 1968
[45] Patented Sept. 28, 1971
[73] Assignee Coditron Corporation
 New York, N.Y.

[54] FREQUENCY DETECTOR
 5 Claims, 4 Drawing Figs.
[52] U.S. Cl. ................................................ 329/126,
 307/233, 307/234, 328/111, 328/112
[51] Int. Cl. ....................................................... H03d 3/04,
 H03k 5/20
[50] Field of Search.......................................... 307/232,
 233, 234; 328/110, 134, 138, 140, 141, 111, 112;
 329/126, 128; 331/25

[56] References Cited
 UNITED STATES PATENTS
2,951,973 9/1960 Atkinson...................... 328/138 X
3,011,128 11/1961 Filipowsky................... 328/127 X
 OTHER REFERENCES
 E. G. Nassimbene " Pulse Interval Detector," IBM Technical Disclosure Bulletin p. 455, Vol. 7, No. 6, November 1964 (307-233)

Primary Examiner—Roy Lake
Assistant Examiner—Lawrence J. Dahl
Attorney—Blum, Moscovitz, Friedman & Kaplan ABSTRACT: A frequency detector adapted to produce an output signal when a first intermediate signal produced by a first circuit means in response to an input signal at a time representative of the period of the desired frequency, is in time coincidence with a second intermediate signal produced by a second circuit means in response to said input signal at a time representative of the period of the frequency of said input signal.

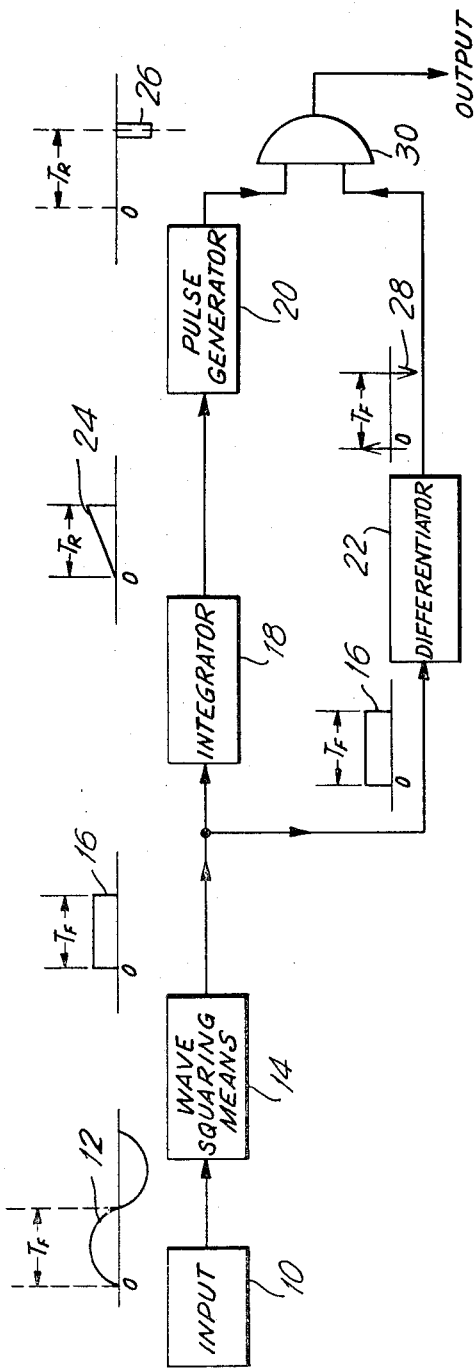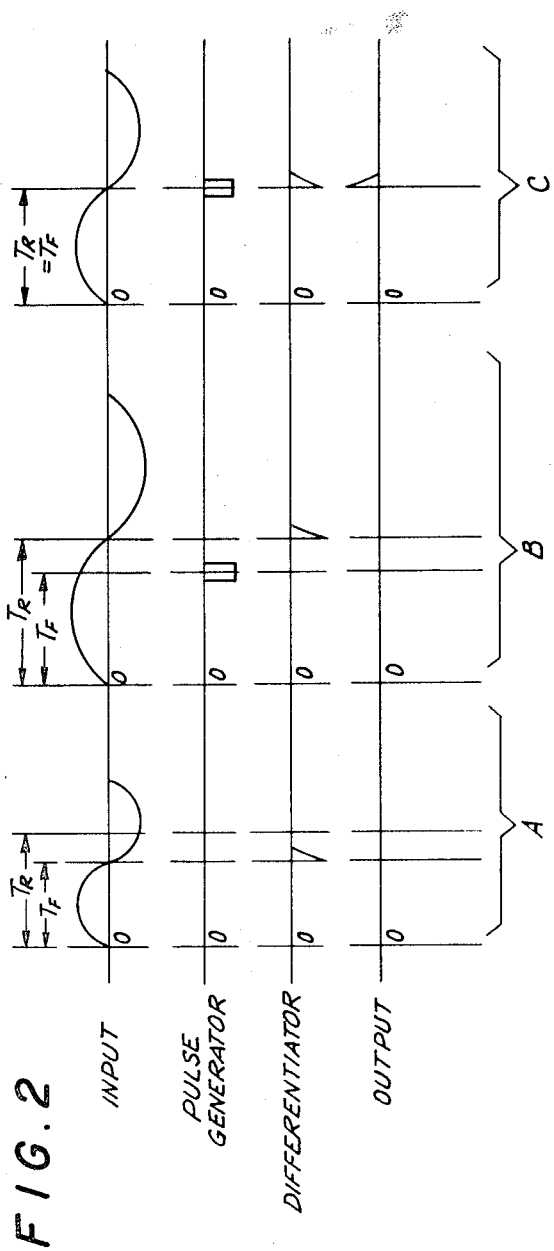

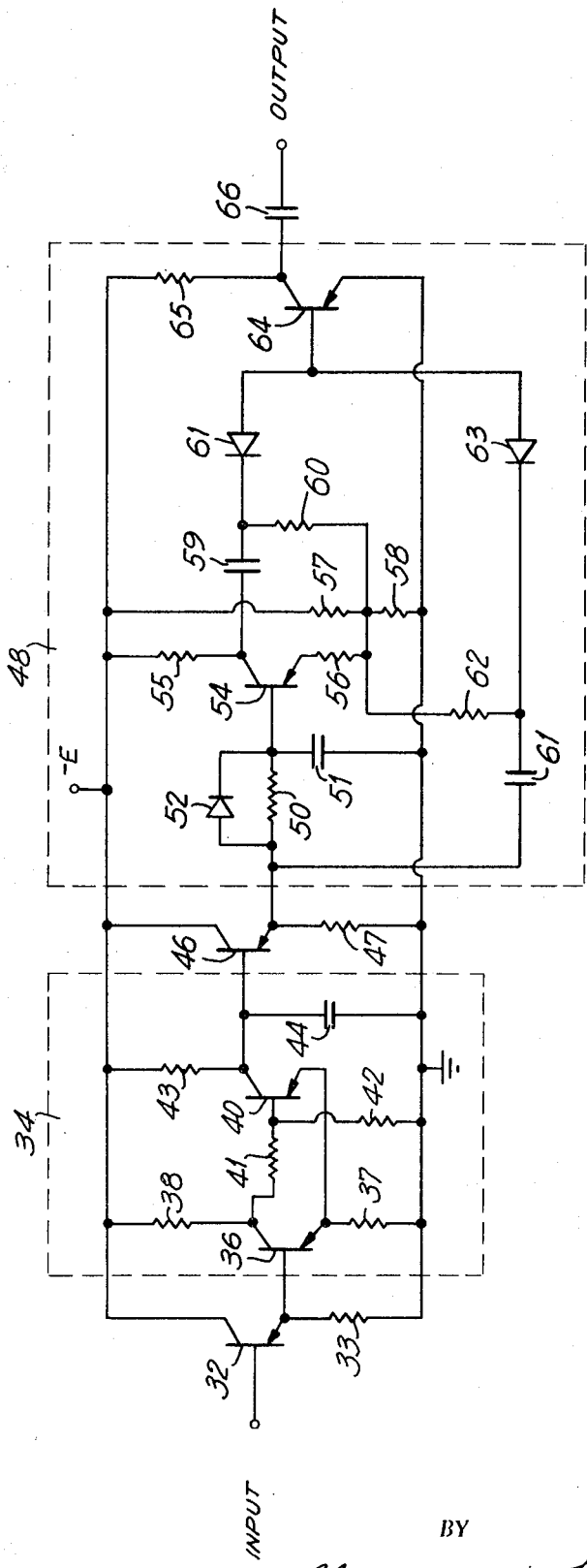

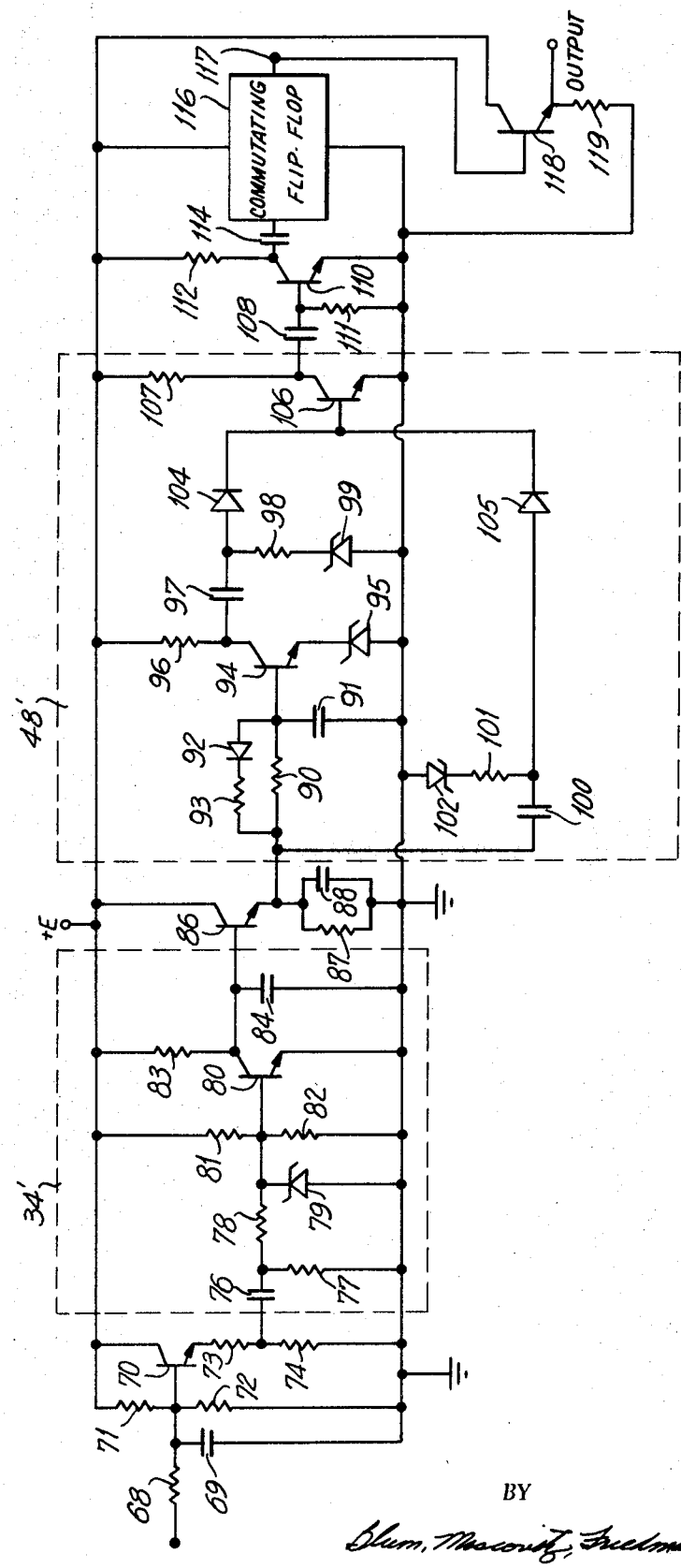

FREQUENCY DETECTOR

BACKGROUND OF THE INVENTION

This invention relates generally to frequency detectors useful in the decoder circuits of communications systems having a plurality of remote stations. Such decoder circuits are utilized to detect a signal of a particular frequency and to perform some operation in response to that signal such as ringing a speaker to alert the operator of the remote station or to activate a relay or other switch to turn a receiver on. In the art, the decoder circuit usually includes a resonant reed relay consisting of one or more steel reeds suspended in a magnetic circuit including a field coil. Each reed has a relay contact which closes intermittently when the reed vibrates at its resonant frequency. An AC input signal is applied to the field coil and produces an alternating flux that increases and decreases the magnetic circuit flux density once each cycle. When the frequency of said AC signal is the same as the frequency of the reed, the alternating flux causes the reed to vibrate and actuate a responsive circuit of the type described above.

Such resonant reed relays are expensive and require frequent replacement due to the failure of the steel rods under the stress of vibration. Further, reed relays are sensitive to shock or vibration since such shock or vibration, in the direction of reed travel, can excite or dampen the vibration of said reed. Accordingly, they require extensive shock mountings, and even such mountings are insufficient in the face of severe shocks and vibrations. The latter problem is particularly severe where the remote communications station is a portable receiver-transmitter.

SUMMARY OF THE INVENTION

Generally speaking, in accordance with the invention, a circuit is provided which will produce an output when an input signal of a predetermined frequency is applied thereto, said circuit including first circuit means responsive to said input signal for producing a first intermediate signal at a time representative of the period of said predetermined frequency, second circuit means responsive to said input signal for producing a second intermediate signal at at time representative of the period of the frequency of said input signal and gate means responsive to said first and second intermediate signals for producing an output signal when said first and second intermediate signals are in time coincidence.

The input signal is shaped into a substantially square wave before being applied to said first and second circuit means. Said first circuit means includes a series-connected integrator circuit and pulse generator, said pulse generator being adapted to produce said first intermediate signal when said integrator circuit output reaches a predetermined threshold voltage. Said second circuit means includes a differentiator circuit.

Accordingly, it is an object of this invention to provide an electronic frequency detector capable of replacing resonant reed relays.

Another object of the invention is to provide a frequency detector in which a first signal produced at a time representative of the period of the frequency to be detected must be in time coincidence with a second signal produced at a time representative of the period of the frequency of the input signal, for an output signal to be produced.

A further object of the invention is to provide a frequency detector which, by the selection of the value of a few components can be adapted to detect any of a large range of frequencies and bands thereof.

Still another object of the invention is to provide a frequency detector which is compact in size and simple and inexpensive to construct.

Another object of the invention is to provide a frequency detector which is substantially immune to shocks and vibrations.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a block diagram of the frequency detector according to the invention;

FIG. 2 is a diagrammatic view showing the wave forms produced by the frequency detector of FIG. 1 having input frequencies of a value greater than, less than, and equal to the frequency to be detected, applied thereto;

FIG. 3 is a detailed electric circuit diagram of a first embodiment of the frequency detector according to invention; and FIG. 4 is a detailed electric circuit diagram of a second embodiment of the frequency detector according to the invention. DESCRIPTION OF THE PREFERRED EMBODIMENTS Referring now to FIG. 1, a block diagram of the frequency detector according to the invention is shown. The input 10 to the frequency detector is generally sinusoidal and has a half wavelength of $T_f$ as shown in waveform 12 of FIG. 1. In a communications system, said input would generally be taken from the discriminator or the audio section of an AM or FM receiver. The sinusoidal input is applied to wave-squaring means 14 adapted to shape the input waveform into a square wave. In practice, only the positive or negative half wave of each cycle is required, and accordingly, the wave squaring means preferably includes means for cutting off one or the other of said portions of the square wave. Thus, the waveform 16 of the output of wave squaring means 14 is shown to be a positive squared pulse of a duration $T_f$.

This positive pulse is applied to both a first circuit means consisting of integrator circuit 18 and pulse generator 20 in series connection and a second circuit means consisting of differentiator 22. The integrator circuit 18 integrates the input pulse 16 in a conventional manner to produce the signal shown in waveform 24. The slope of this signal is determined by the R-C time constant of the integrator circuit. The output of integrator 18 is applied to pulse generator 20 and used to trigger said pulse generator if the voltage of the integrator circuit output reaches a predetermined threshold voltage, at which time pulse generator 20 produces a first intermediate signal. The components of the integrator circuit 18 and pulse generator 20 are selected so that said first intermediate signal is produced at a time $T_R$ representative of the period of the predetermined frequency. Thus, as shown in waveform 24, the integrator circuit output rises to a preselected threshold voltage at a time $T_R$ as shown in waveform 26. In the embodiment shown the reference time $t_R$ equals one-half wavelength of the frequency to be detected.

The output of wave squaring means 14 is also applied to differentiator 22 which, in a conventional manner, produces a positive spike pulse at time $t=0$ and a negative spike pulse at time $t=T_f$ as shown in waveform 28. Thus, differentiator 22 produces a second intermediate signal at a time representative of the period of the frequency of the input signal.

The first intermediate signal produced by pulse generator 20 and the second intermediate signal produced by differentiator 22 are applied to "AND" gate 30 to produce an output signal when said first and second intermediate signals are in time coincidence. Thus, an output signal will be produced only when $T_f = T_r$.

The operation of the frequency detector according to the invention can best be understood by having reference to the waveforms diagrammatically shown in FIG. 2. Referring first to the portion of FIG. 2 encompassed by bracket A, an input signal is shown of a frequency greater than the frequency to be detected, so that $T_f$ is less than $T_R$. With such an input voltage, the output of integrator 18 will never reach the predetermined threshold voltage so that pulse generator 20 will not fire. Since the first and second intermediate signals will never be in time coincidence, there is no output from "AND" gate 30.

In like manner in the portion of FIG. 2 encompassed by bracket B, the input signal is of a frequency less than the frequency to be detected whereby $T_f$ is greater than $T_R$. In this circumstance, integrator 18 produces an output signal which reaches the threshold voltage sufficient to fire pulse generator 20, but that voltage is reached at a predetermined time $T_R$, due to the inherent design of said integrator and pulse generator, so that the first intermediate signal produced by pulse generator 20 is not in time coincidence with the second intermediate signal produced by differentiator 22 at time $t=T_f$. In both of the foregoing examples, the frequency detector circuit according to the invention serves as a filter to screen unwanted frequency signals.

Referring now to the portion of FIG. 2 encompassed by bracket C, the input signal is of a frequency equal to the frequency to be detected whereby $T_f=T_R$. Accordingly, the first intermediate signal produced by pulse generator 20 and the second intermediate signal produced by differentiator 22 are in time coincidence so that gate 30 produces an output signal indicating the presence of an input signal of a predetermined frequency.

Integrator 18 and pulse generator 20 can be adapted to produce, at time $T_R$ a pulse of any desired duration. In this manner, the frequency detector according to the invention can be adapted to detect a band of predetermined frequencies.

The circuit diagram of a first embodiment of the frequency detector according to the invention is shown in FIG. 3. The input signal is applied to the base of transistor 32 which is connected as an emitter follower with its collector connected to the supply voltage therefore, in this case, a source of direct-current voltage—E. The emitter follower serves to isolate the frequency detector according to the invention from the input circuits and provides impedance matching therebetween. Wave shaping means 14 is provided in the form of a conventional Schmitt trigger 34. Said Schmitt trigger consists of transistor 36 having its base connected to the emitter of transistor 32, its emitter connected to ground through resistor 37 and its collector connected to the supply voltage through resistor 38. The emitter of transistor 36 is also connected to the emitter of transistor 40, the base of transistor 40 being connected to the collector of transistor 36 through resistor 41 and to ground through resistor 42. The collector of transistor 40 is connected to the supply voltage through resistor 43 while capacitor 44 is provided between said collector and ground to limit noise in the circuit. In its quiescent condition, transistor 36 is cut off and transistor 40 operates at saturation. When a negative signal of sufficient amplitude is applied to the base of transistor 36, that transistor is driven into conduction and transistor 40 is cut off to produce a negative potential at its collector. This stable state is maintained until the voltage applied to the base of transistor 36 rises to a level where transistor 36 is cut off and transistor 40 is once again operating at saturation, thereby returning the circuit to its original operating condition.

The output of Schmitt trigger 34, taken at the collector of transistor 40 consists of a squared half-wave pulse of a duration equal to $T_f$. This pulse is supplied to the base of transistor 46 which is also connected as an emitter follower with its collector connected to the supply voltage and the emitter connected through resistor 47 to ground. This emitter follower stage also provides impedance matching and isolation. The output of the emitter follower, taken at the emitter of transistor 46 is then applied to the detector portion 48 of the frequency detector according to the invention consisting of integrator 18, pulse generator 20, differentiator 22 and gate 30.

The first branch of detector portion 48 includes an integrator circuit comprising resistor 50 connected to the output of the emitter follower stage (the emitter of transistor 46) and capacitor 51 connected between resistor 50 and ground. Resistor 50 is shunted by diode 52 to provide a discharge path for capacitor 51. The voltage across capacitor 51 is applied to the base of transistor 54 which forms a part of the pulse generator 20. The collector of transistor 54 is connected to the supply voltage through resistor 55. The emitter of transistor 54 is referenced to a predetermined threshold voltage by being connected through resistor 56 to an intermediate point on a voltage divider defined by resistors 57 and 58, which are disposed in series connection between the voltage supply and ground. The threshold voltage defined by the relative value of resistors 57 and 58 determines the voltage required to change the conduction state of transistor 54 to produce the first intermediate signal. The pulse generator is completed by capacitor 59 connected to the collector of transistor 54 and resistor 60 connected between capacitor 59 and the intersection of resistors 57 and 58. Integrator circuit 18 and pulse generator 20 are adjusted to produce a first intermediate signal at a time representative of the period of the frequency to be detected. This adjustment is accomplished by selecting the values of resistor 50 and capacitor 51, which determines the slope of the output signal of the integrator circuit and selecting the threshold voltage, as defined by the relative value of resistors 57 and 58, which determines the point on the slope of said signal at which the conduction state of transistor 54 changes.

The second branch of the detector portion 48 comprises differentiator circuit 22 which is formed from capacitor 61 which is also connected to the output of the emitter follower stage (emitter of transistor 46), and resistor 62 which is connected between capacitor 61 and the intersection of resistor 57 and 58. Said detector portion is completed by "AND" gate 30 which comprises diode 61 connected at its cathode to capacitor 59 to receive said first intermediate signal from the pulse generator and diode 63 connected at its cathode to capacitor 61 to receive the second intermediate signal from the differentiator circuit The respective anodes 61 and 63 are connected to the base of transistor 64. The emitter of transistor 64 is connected to ground while the base thereof is connected through resistor 65 to the power supply. The output of the "AND " gate is taken at the collector of transistor 64 through capacitor 66 which eliminates any DC component of the output signal. When the first and second intermediate signals applied respectively to the cathodes of diodes 61 and 63 are in time coincidence, the conduction state of transistor 64 changes to produce the output signal. A signal applied to just one of said diodes is insufficient to change the conduction state of transistor 64.

While all of the transistors in the embodiment of the frequency detector according to the invention shown in FIG. 3 are of the PNP type, this is merely shown by way of example and not by way of limitation. The frequency detector of FIG. 3 can utilize NPN-type transistors with an appropriate adjustment in the polarity of the supply voltage and in the alignment of the various diodes within the circuit. Further, resistors 60 and 62 and transistor 56 need not be referenced to the same voltage and plurality of voltage dividers, different taps on a single voltage divider or even Zener diodes can be utilized for this purpose.

Referring now to FIG. 4, a second embodiment of the frequency detector according to the invention is shown. This embodiment utilizes NPN-type transistors, although PNP-type transistors could also be utilized with minor changes in the circuit.

The input signal is applied to a low-pass filter consisting of resistor 68 and capacitor 69 extending between said resistor and ground. The input signal is then passed to an emitter follower stage consisting of transistor 70 connected at its base to resistor 68. Said base is also connected to a source of direct-current potential +E, constituting the supply voltage for the circuit, through resistor 71 and to ground through resistor 72.

The collector of transistor 70 is connected to said source voltage while the emitter is connected through resistors 73 and 74 to ground. The latter resistors serve as a voltage divider with the output of the emitter follower stage taken between said resistors. Both the low-pass filter and the emitter follower stage serve to isolate the frequency detector according to the invention from the input thereto and also provide impedance matching therebetween. The wave-squaring means portion 34' of the second embodiment utilizes a group of limiter and other wave shaping circuits instead of a Schmitt trigger to produce a positive pulse of a duration equal to one-half wavelength of the input signal.

The wave-shaping means consists of capacitor 76 connected at one terminal to the intersection of resistors 73 and 74 and at its other terminal to the intersection of resistors 77 and 78, resistor 77 being connected to ground. The other terminal of resistor 78 is connected to the cathode of zener diode 79, the anode thereof being connected to ground. The base of transistor 80 is connected to the intersection of resistor 78 and the cathode of Zener diode 79. Said base is connected to the power supply through resistor 81 and to ground through resistor 82. The collector of transistor 80 is connected to the power supply through resistor 83 and is shunted to ground by capacitor 84. Capacitor 76 is adapted to eliminate the DC component of the input signal, while Zener diode 79 provides a reference voltage to the limitor circuit which clips the negative portion of the input signal. Said clipped negative portion cuts off transistor 80 from conduction to form the half wavelength positive pulse at the collector thereof.

The output of the wave squaring means portion 34' is connected to the base of transistor 86 defining an emitter follower stage for isolation and impedance matching. The collector of transistor 86 is connected to the voltage source while the emitter thereof is connected to ground through parallel-connected resistor 87 and capacitor 88. Capacitors 84 and 88 are adapted to reduce the noise in the circuit.

The detector portion 48' of the embodiment of FIG. 4 is similar to the arrangement of FIG. 3. The integrator circuit consists of resistor 90 connected to the emitter of transistor 86 and capacitor 91 connected between said resistor and ground. Resistor 90 is shunted by diode 92 and resistor 93 to provide a discharge path for capacitor 91. Resistor 93 serves to slow the discharge time of said capacitor, thereby adjusting the band width of the pulse forming the first intermediate signal to broaden the band of frequencies detected by the frequency detector according to the invention. The pulse generator includes transistor 94 connected at its base of the intersection of resistor 90 and capacitor 91. The threshold reference voltage is provided by Zener diode 95 connected at its cathode to the emitter of transistor 94 and at its anode to ground. The collector of transistor 94 is connected through resistor 96 to the voltage source and is further connected to capacitor 97. The other terminal of capacitor 97 is connected to ground through resistor 98 and Zener diode 99. The differentiator circuit consists of capacitor 100 connected at one terminal to the emitter of transistor 86 and at its other terminal to resistor 101. A Zener diode is connected at its cathode to resistor 101 and at its anode to ground.

The decoder portion 48' is completed by an "AND" gate defined by diode 104 connected at its anode to capacitor 97, diode 105 connected at its anode to capacitor 100 and transistor 106 connected at its base to the cathodes of said diodes. The collector of transistor 106 is connected through resistor 107 to the voltage source, while the emitter thereof is connected to ground. The above-described "AND" gate defined by diodes 61 and 63 and transistor 64 of FIG. 3 to provide an output only when the first intermediate signal from the pulse generator and the second intermediate signal from the differentiator are in time coincidence.

The output signal of the "AND" gate is further operated upon in the embodiment shown in FIG. 4 to produce an alternating signal rather than the train of pulses produced in the embodiment of FIG. 3. Thus, one terminal of capacitor 108 is connected to the collector of transistor 106, the other terminal thereof being connected to the base of transistor 110 which defines an amplifier-inverter circuit. The base of transistor 110 is connected through resistor 111 to ground the emitter thereof is connected to ground, while the collector thereof is connected to the source potential through resistor 112. The output of transistor 110, which is a negative pulse, is applied through capacitor 114 to the input of commutating flip-flop 116 of conventional design. Capacitors 108 and 114 serve to isolate the various circuit elements and remove any DC components of the signals. Each negative pulse from the amplifier-inverter stage changes the state of the commutating flip-flop whereby an alternating square wave signal of a frequency equal to one-half of the input signal frequency is produced at output 117 of commutating flip-flop 116. This signal is applied to the base of transistor 118 which defines an emitter follower stage for isolation and impedance matching. The collector of transistor 118 is connected to the voltage source while the emitter is connected to ground through resistor 119. The output of the circuit of FIG. 4 is taken at the emitter of said transistor.

The frequency decoder according to the invention, as exemplified by the specific circuits of FIGS. 3 and 4, may be produced in an extremely compact and rugged form which is substantially immune to shock and vibration during operation. Either of the arrangements shown may be substituted directly for a resonant reed relay in existing communication devices. The output of the frequency detector can be applied to ring a speaker to attract the attention of the operator of a remote communications station or can be utilized to actuate a relay or other switch to turn on a receiver. The arrangement according to the invention can also be applied to other devices requiring frequency detection and is readily and inexpensively producible utilizing state of the art components. It is particularly adapted to detect low frequency signals of an order of 5 to 300 Hertz.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A frequency detector responsive to a substantially square-wave input signal of predetermined frequency comprising first circuit means including an integrator circuit responsive to said input signal and pulse generator means responsive to the output signal of said integrator for producing a first intermediate signal when said integrator circuit output reaches a predetermined threshold voltage at a time representative of the period of said predetermined frequency; second circuit means including a differentiator circuit responsive to said input signal for producing a second intermediate signal at a time representative of the period of the frequency of said input signal; and gate means having a pair of inputs each connected to one of said first and second circuit means, said gate means being responsive to said first and second intermediate signals for producing an output signal when said first and second intermediate signals are in time coincidence.

2. A frequency detector as recited in claim 1, including wave squaring means responsive to said input signal for shaping said input signal into a substantially square wave, said first and second circuit means being responsive to said squared input 3. A frequency detector as recited in claim 1, wherein said first intermediate signal is in the form of a pulse of a predetermined duration, whereby said frequency detector is responsive to a band of predetermined frequencies.

4. A frequency detector as recited in claim 1, wherein said first circuit means includes a source of direct-current potential to provide source voltages therefor, said pulse generator including a voltage divider connected between said source of direct-current potential and ground and having an intermediate voltage output, said predetermined threshold voltage being determined by said intermediate voltage, whereby said frequency detector functions substantially independently of fluctuations in said direct-current voltage source.

5. A frequency detector as recited in claim 1, wherein said output signal comprises a train of pulses of said predetermined frequency, said frequency detector including third circuit means responsive to said output signal for producing an alternating signal of a frequency representative of said predetermined frequency.